United States Patent
Kaneko

(10) Patent No.: US 10,215,249 B2
(45) Date of Patent: Feb. 26, 2019

(54) VIBRATION DAMPING DEVICE

(71) Applicant: BRIDGESTONE CORPORATION, Tokyo (JP)

(72) Inventor: Akinori Kaneko, Iwata (JP)

(73) Assignee: BRIDGESTONE CORPORATION, Chuo-ku, Tokyo (JP)

(*) Notice: Subject to any disclaimer, the term of this patent is extended or adjusted under 35 U.S.C. 154(b) by 0 days.

(21) Appl. No.: 15/539,902

(22) PCT Filed: Dec. 2, 2015

(86) PCT No.: PCT/JP2015/005990
§ 371 (c)(1),
(2) Date: Jun. 26, 2017

(87) PCT Pub. No.: WO2016/113792
PCT Pub. Date: Jul. 21, 2016

(65) Prior Publication Data
US 2017/0343072 A1    Nov. 30, 2017

(30) Foreign Application Priority Data

Jan. 13, 2015 (JP) ................................. 2015-004258

(51) Int. Cl.
*F16F 1/38* (2006.01)
*B60G 7/00* (2006.01)

(52) U.S. Cl.
CPC .............. *F16F 1/38* (2013.01); *B60G 7/001* (2013.01); *F16F 1/3849* (2013.01);
(Continued)

(58) Field of Classification Search
CPC ...... F16F 1/38; F16F 2238/04; F16F 2236/00; B60G 7/001
(Continued)

(56) References Cited

U.S. PATENT DOCUMENTS 5,273,261 A * 12/1993 Hamberg ................ F16F 13/14
180/312
2005/0206057 A1* 9/2005 Endo .................... F16F 1/3849
267/292
(Continued)

FOREIGN PATENT DOCUMENTS

CN       1845833 A    10/2006
CN     102207168 A    10/2011
(Continued)

OTHER PUBLICATIONS

International Search Report of PCT/JP2015/005990 dated Feb. 2, 2016 [PCT/ISA/210].
(Continued)

*Primary Examiner* — Thomas J Williams
*Assistant Examiner* — Mariano Sy
(74) *Attorney, Agent, or Firm* — Sughrue Mion, PLLC

(57) ABSTRACT

The vibration damping device 1 comprises an outer cylinder member 9 formed by winding a flat plate member into a cylindrical shape; an inner mounting member 11 connected to the outer cylinder member via elastic members 14; and a rod portion 30, wherein: the outer cylinder member has a meeting portion 60 where end surfaces of the flat plate member on both circumferential ends of the outer cylinder member face each other; a joint portion 61, where joining was performed, is formed on at least a part of the meeting portion; and the rod portion is connected to an outer circumferential surface of the outer cylinder member so as to not overlap the meeting portion.

5 Claims, 2 Drawing Sheets

(52) U.S. Cl.
CPC ..... *F16F 2226/048* (2013.01); *F16F 2236/00* (2013.01); *F16F 2238/04* (2013.01)

(58) Field of Classification Search
USPC ...................................... 267/257, 141.1, 219
See application file for complete search history.

(56) References Cited

U.S. PATENT DOCUMENTS

| | | | |
|---|---|---|---|
| 2005/0254888 A1* | 11/2005 | Oji ........................ | F16F 1/3849 403/187 |
| 2007/0018367 A1 | 1/2007 | Kamei | |
| 2007/0272051 A1* | 11/2007 | Kamei ................... | B60G 7/001 74/579 R |
| 2008/0315473 A1* | 12/2008 | Nishimae .............. | F16F 1/3849 267/140.11 |
| 2011/0233834 A1 | 9/2011 | Kashihara et al. | |
| 2014/0284858 A1* | 9/2014 | Sakata ................... | F16F 1/3849 267/141.1 |
| 2015/0204405 A1* | 7/2015 | Shimada ............... | F16F 1/3828 267/141.2 |
| 2015/0300436 A1 | 10/2015 | Kojima | |
| 2015/0300446 A1* | 10/2015 | Shimada ............... | F16F 1/3849 267/140.4 |
| 2016/0193907 A1* | 7/2016 | Satou .................... | F16F 1/3849 267/140.4 |
| 2017/0343072 A1 | 11/2017 | Kaneko | |

FOREIGN PATENT DOCUMENTS

| | | |
|---|---|---|
| CN | 104755791 A | 7/2015 |
| CN | 107110266 A | 8/2017 |
| JP | 2005-299898 A | 10/2005 |
| JP | 2006-194370 A | 7/2006 |
| JP | 2008-185193 A | 8/2008 |
| JP | 2010-038195 A | 2/2010 |
| JP | 2012-61918 A | 3/2012 |
| JP | 2014181775 A | 9/2014 |
| KR | 10-2011-0026171 A | 3/2011 |
| WO | 2016113792 A1 | 7/2016 |

OTHER PUBLICATIONS

Communication dated Dec. 12, 2017 from the European Patent Office in counterpart application No. 15877749.0.
Communication dated Aug. 2, 2018, from State Intellectual Property Office of the P.R.C. in counterpart application No. 201580073383.8.

* cited by examiner

VIBRATION DAMPING DEVICE

CROSS REFERENCE TO RELATED APPLICATIONS

This application is a National Stage of International Application No. PCT/JP2015/005990, filed Dec. 2, 2015, claiming priority based on Japanese Patent Application No. 2015-004258, filed Jan. 13, 2015, the contents of all of which are incorporated herein by reference in their entirety.

TECHNICAL FIELD

This disclosure relates to a vibration damping device used in, e.g., automobiles.

BACKGROUND

One of conventional vibration damping devices comprises a cylindrical outer cylinder member (first cylinder member) formed as a wound pipe by winding a flat plate member via winding process, a rod portion (bracket member) connected to the outer cylinder member, and a first vibration damping member held in the outer cylinder member via press fitting, wherein a meeting portion (connecting portion) of the outer cylinder member, where end surfaces of the flat plate member on both circumferential sides of the outer cylinder member face each other, extends along an axial direction of the outer cylinder member, and is welded on an outer circumferential surface of the outer cylinder member so as to overlap the meeting portion, while an end surface (abutting portion) of the rod portion connected to the outer cylinder member is directed along a circumferential direction of the outer cylinder member (see, e.g., PTL1).

CITATION LIST

Patent Literature

PTL1: JP2005-299898A

SUMMARY

Technical Problem

According to the vibration damping device as disclosed in PTL1, stress concentrates in the vicinity of the meeting portion of the outer cylinder member in response to a load input in the axial direction of the rod portion. Thus, there is still a room for improvement of the durability in the vicinity of the meeting portion of the outer cylinder member.

This disclosure aims to provide a vibration damping device with improved durability of the outer cylinder member.

Solution to Problem

The vibration damping device of this disclosure comprises:

an outer cylinder member formed by winding a flat plate member into a cylindrical shape;

an inner mounting member positioned at an inner circumferential side of the outer cylinder member, connected to the outer cylinder member via an elastic member, and configured to be connected to either one of a vibration generating portion and a vibration receiving portion; and a rod portion configured to connect the outer cylinder member to an other one of the vibration generating portion and the vibration receiving portion, wherein:

the outer cylinder member has a meeting portion, where end surfaces of the flat plate member, on both sides in a circumferential direction of the outer cylinder member, face each other;

a joint portion, where joining was performed, is formed on at least a part of the meeting portion; and the rod portion is joined to an outer circumferential surface of the outer cylinder member so as to not overlap the meeting portion.

According to the vibration damping device of this disclosure, it is possible to improve the durability of the outer cylinder member.

In the vibration damping device of this disclosure, the meeting portion may be located within an angular range in a circumferential direction of the outer cylinder member, displaced by 35° to 65° along the circumferential direction of the outer cylinder member, from a position where the outer cylinder member and a central axis of the rod portion intersect each other.

According to this configuration, it is possible to further improve the durability of the outer cylinder member.

In the vibration damping device of this disclosure, when the meeting portion is seen from an outer circumferential side of the outer cylinder member, at least a part of a portion of the meeting portion on which the joint portion is formed may extend in a direction intersecting an axial direction of the outer cylinder member.

According to this configuration, it is possible to further improve the durability of the outer cylinder member.

Advantageous Effect

According to this disclosure, it is possible to provide a vibration damping device with improved durability of the outer cylinder member.

DETAILED DESCRIPTION

Figure 1:
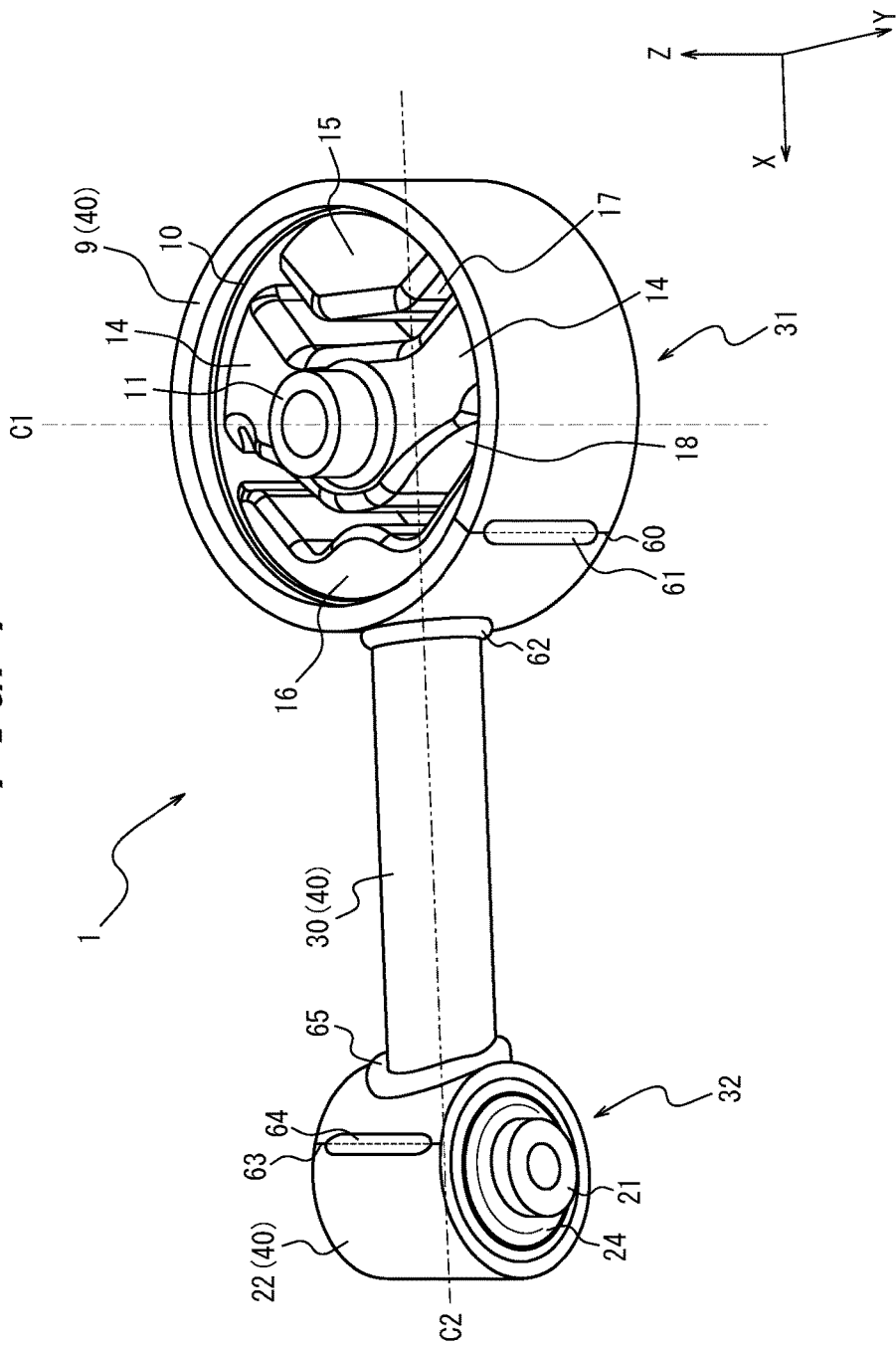
FIG. 1 illustrates a perspective view showing an embodiment of the vibration damping device of this disclosure.

Hereinafter, an embodiment of the vibration damping device according to this disclosure is exemplified while referring to the drawings.

Figure 2:
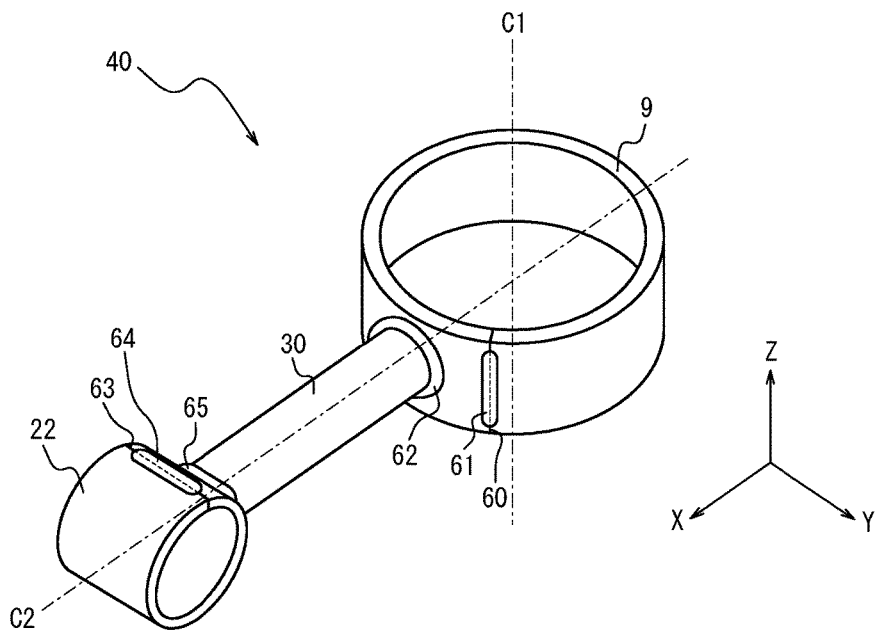
FIG. 2 illustrates a perspective view showing a bracket of the vibration damping device of FIG. 1.

FIG. 1 and FIG. 2 illustrate an embodiment of the vibration damping device of this disclosure. The vibration damping device 1 of the present embodiment is configured as a torque rod for vehicles, and as illustrated in FIG. 1, includes a first bush 31, a second bush 32, and a rod portion 30 connecting the first bush 31 and the second bush 32.

The first bush 31 includes: a first outer cylinder member 9 (outer cylinder member); an intermediate cylinder member 10 press-fitted to an inner circumferential surface of the first outer cylinder member 9; a first inner mounting member 11 (inner mounting member) positioned at an inner circumferential side of the first outer cylinder member 9 and of the intermediate cylinder member 10; and main elastic bodies 14 fixed via vulcanization adhesion, etc. to the inner circumferential surface of the intermediate cylinder member 10 and to the outer circumferential surface of the first inner mounting member 11.

In the present example, the first inner mounting member 11 is connected to the first outer cylinder member 9 via the main elastic bodies 14 and the intermediate cylinder member 10. However, the first inner mounting member 11 may be connected to the first outer cylinder member 9 via only the main elastic bodies 14, by omitting the intermediate cylinder member 10 and fixing the main elastic bodies 14 via vulcanization adhesion, etc. to the inner circumferential surface of the first outer cylinder member 9 and to the outer circumferential surface of the first inner mounting member 11.

The first inner mounting member 11 is formed into a cylindrical shape in the present example, but may be formed into a tubular shape having any other outer circumferential surface shape, or may be formed into a solid shape having any outer circumferential surface shape.

In the present example, the second bush 32 has a diameter smaller than the first bush 31. The second bush 32 includes a cylindrical, second outer cylinder member 22, and a cylindrical, second inner mounting member 21 positioned at the inner circumferential side of the second outer cylinder member 22 and connected to the second outer cylinder member 22 via an elastic member 24. Here, similarly to the first bush 31, the second bush 32 may include a second intermediate cylinder member between the second outer cylinder member 22 and the elastic member 24.

The first outer cylinder member 9, the rod portion 30 and the second outer cylinder member 22 are fixed to each other via welding, and constitute the bracket 40.

The first inner mounting member 11 is configured to be connected to one of a vibration generating portion (engine, etc.) and a vibration receiving portion (vehicle, etc.). On the other hand, the first outer cylinder member 9 is configured to be connected to the other of the vibration generating portion and the vibration receiving portion, via the rod portion 30, the second outer cylinder member 22, the second inner mounting member 21, etc.

Here, in the present example, the rod portion 30 is arranged such that, one of its end portions, on the opposite side of the other one of its end portions connected to the first bush 31 (more specifically, to the outer circumferential surface of the first outer cylinder member 9), is connected to the second bush 32. However, the end portion of the rod portion 30, on the opposite side of the other end portion of the rod portion 30 connected to the first bush 31, may be connected to any member other than the second bush 32 that is configured to be connected to the other one of the vibration generating portion and the vibration receiving portion.

The rod portion 30 may extend in any direction of the vehicle, such as the front-back direction of the vehicle and the like.

Hereinafter, for convenience of explanation, a direction along a central axis C1 of the first outer cylinder member 9 (hereinafter also referred to as "axial direction of the first outer cylinder member 9") is defined as a Z axis direction, a direction along a central axis C2 of the rod portion 30 (hereinafter also referred to as "axial direction of the rod portion 30") is defined as an X axis direction, and a direction orthogonal to both the Z axis direction and the X axis direction is defined as a Y axis direction.

In the example of FIG. 1, the axial direction of the first outer cylinder member 9 (the Z axis direction) and the axial direction of the second outer cylinder member 22 are orthogonal to each other, however these directions may be any directions with respect to each other.

In the example of FIG. 1, in addition to main elastic bodies 14 (a pair of main elastic bodies 14 on both sides in the Y axis direction, in the illustrated example), connecting the first inner mounting member 11 to the first outer cylinder member 9 (via the intermediate cylinder member 10), the first bush 31 further includes stopper elastic bodies 15, 16 (on both sides in the X axis direction, in the illustrated example) fixed to the first outer cylinder member 9 (via the intermediate cylinder member 10). The stopper elastic bodies 15, 16 respectively face the first inner mounting member 11 in the radial direction of the first outer cylinder member 9, across cavity portions 17, 18. Here, in the present example, the pair of main elastic bodies 14 are connected to each other integrally.

In the example of FIG. 1, the main elastic bodies 14 and the stopper elastic bodies 15, 16 are connected via thin elastic body portions fixed to the intermediate cylinder member 10, however they are capable of deforming independently from each other, such that the vibration damping function of the main elastic bodies 14 is not affected by the stopper elastic bodies 15, 16.

Here, the main elastic bodies 14 may have any configuration other than the aforementioned configuration, as long as one or more main elastic body 14 connects the first inner mounting member 11 to the first outer cylinder member 9, either via the intermediate cylinder member 10 or not via the intermediate cylinder member 10.

In the present example, the rod portion 30 is formed into a cylindrical shape, and thereby is capable of reducing the cost as compared with the case where, e.g., it is formed into a solid shape. Here, other than a cylindrical shape, the rod portion 30 may be formed into a tubular shape having any outer circumferential surface shape, or may be formed into a solid shape having any outer circumferential surface shape.

In the present embodiment, the first outer cylinder member 9 is formed by winding a flat plate member, such as a steel plate and the like, into a cylindrical shape via roll shaping, and has a meeting portion 60, where end surfaces of the flat plate member on both circumferential sides of the first outer cylinder member 9 face each other (abut each other, in the illustrated example). The meeting portion 60 extends over the entire length of the first outer cylinder member 9 in the axial direction of the first outer cylinder member 9.

Here, the expression "end surfaces of the flat plate member on both circumferential sides of the first outer cylinder member 9" merely indicates a pair of end surfaces of the flat plate member which are brought into facing (or abutment) with each other upon roll shaping, and the direction in which this pair of end surfaces face each other (the direction approximately orthogonal to the extending direction of the meeting portion 60) may be any direction.

In the example of FIG. 2, the meeting portion 60 extends along the axial direction of the first outer cylinder member 9 over the entire length of the meeting portion 60. However, when the meeting portion 60 is seen from the outer circumferential side of the first outer cylinder member 9, the meeting portion 60 may extend in any direction. Moreover, other than extending linearly as in the present example, the meeting portion 60 may extend in a curved manner, or extend while bending at more than one positions.

In the present embodiment, over at least a part of the meeting portion 60 (only over the intermediate part of the meeting portion 60 in the extending direction of the meeting portion 60, in the example of FIG. 2), a joint portion 61, where welding was performed, is formed on its outer circumferential surface side of the first outer cylinder member 9, and an end surface of the rod portion 30 on one of its axial sides is connected to the outer circumferential surface of the first outer cylinder member 9 so as to not overlap the meeting portion 60. More specifically, in the example of FIG. 2, the joint portion 61 formed on the meeting portion 60 extends along the axial direction of the first outer cylinder member 9, and both ends of the joint portion 61 in its extending direction are respectively located at positions before reaching the corresponding ends of the first outer cylinder member 9 in the axial direction thereof.

However, the joint portion 61 may be formed on the entire meeting portion 60, or on an arbitrary part of the meeting portion 60.

In the example of FIG. 2, a joint portion 62, where welding was performed, is formed on the outer circumferential surface of the end portion of the rod portion 30 on the first outer cylinder member 9 side, and this outer circumferential surface is joined to the outer circumferential surface of the first outer cylinder member 9 along the entire circumference of the rod portion 30, via the joint portion 62.

In the example of FIG. 2, the second outer cylinder member 22 is formed by winding a flat plate member, such as steel plate and the like, into an approximately cylindrical shape via roll shaping, and has a meeting portion 63. The meeting portion 63 of the second outer cylinder member 22 extends along the axial direction of the second outer cylinder member 22 (Y axis direction) over the entire length of the meeting portion 63. The end surface of the rod portion 30 on the second outer cylinder member 22 side is connected to the outer circumferential surface of the second outer cylinder member 22, so as to not overlap the meeting portion 63 of the second outer cylinder member 22. Further, of all the meeting portion 63 of the second outer cylinder member 22, only the intermediate part of the meeting portion 63 in its extending direction is joined by a joint portion 64. Moreover, the outer circumferential surface of the end portion of the rod portion 30 on the second outer cylinder member 22 side is joined to the outer circumferential surface of the second outer cylinder member 22 along the entire circumference of the rod portion 30, via a joint portion 65.

When manufacturing the vibration damping device 1, for example, first, the first outer cylinder member 9 is formed by winding a flat plate member into an approximately cylindrical shape, and the joint portion 61, where welding was performed, is formed on at least a part of the meeting portion 60 of the first outer cylinder member 9. Moreover, an end surface of the rod portion 30 on one of its axial sides is placed onto the outer circumferential surface of the first outer cylinder member 9, and the outer circumferential surface of the end portion of the rod portion 30 on the first outer cylinder member 9 side is joined to the outer circumferential surface of the first outer cylinder member 9 via welding, to form the joint portion 62. On the other hand, on the second outer cylinder member 22 side, similarly, the second outer cylinder member 22 is formed by winding a flat plate member into an approximately cylindrical shape, and the joint portion 64, where welding was performed, is formed on at least a part of the meeting portion 63 of the second outer cylinder member 22. Moreover, the end surface of the rod portion 30 on the other one of its axial sides is joined to the outer circumferential surface of the second outer cylinder member 22, to obtain the bracket 40. Afterward, a structure comprising the first inner mounting member 11 and the intermediate cylinder member 10, connected via the main elastic bodies 14, is press-fitted into the inner circumferential surface of the first outer cylinder member 9, to obtain the first bush 31. Moreover, similarly, the second inner mounting member 21 and the second elastic member 24 are press-fitted into the inner circumferential surface of the second outer cylinder member 22, to obtain the second bush 32, and thereby, the vibration damping device 1 is obtained.

However, the vibration damping device 1 may be manufactured via other methods.

Suppose, if the rod portion 30 were to be connected to the outer circumferential surface of the first outer cylinder member 9 so as to overlap the meeting portion 60, and the joint portion 61 were attempted to be formed on the part of the meeting portion 60 overlapping the end surface of the rod portion 30, sufficient strength for connecting the rod portion 30 to the first outer cylinder member 9 would not be obtainable, which would not be favorable. Moreover, if the joint portion 61 were to be formed on a part of the meeting portion 60 on the inner circumferential side of the rod portion 30 with respect to the rod portion 30, the labor and the time for welding would be increased accordingly, which would not be favorable. Therefore, in this case, considering weld strength and welding workability, it may be preferable to form the joint portion 61 only on a part of the meeting portion 60 extending on the outer side of the outer circumferential surface of the rod portion 30, however, on the other hand, with this configuration, sufficient extending length of the joint portion 61 would not be obtainable.

In this regard, according to the present embodiment, since the rod portion 30 is connected to the outer circumferential surface of the first outer cylinder member 9 so as to not overlap the meeting portion 60, for example, as compared with the case where the rod portion 30 is connected to the outer circumferential surface of the first outer cylinder member 9 so as to overlap the meeting portion 60, it is possible to obtain a larger extending length of the joint portion 61 formed on the meeting portion 60. Thereby, it is possible to improve the joint strength of the meeting portion 60, and to suppress the concentration of stress in response to the load input in the axial direction of the rod portion 30 in the vicinity of the meeting portion 60 and in the vicinity of the end portion of the rod 30 on its first outer cylinder member 9 side. In this way, according to the present embodiment, it is possible to improve the durability of the first outer cylinder member 9. Moreover, by enabling improvement of the durability of the first outer cylinder member 9, it becomes possible to reduce the weight and the cost of the vibration damping device, by changing the plate thickness and the material of the first outer cylinder member 9 and the rod portion 30.

In order to confirm the aforementioned effects of the present embodiment, performances of the bracket 40 according to the example of FIG. 2 and of a bracket according to a comparative example (not illustrated) were evaluated via analysis. The bracket of the comparative example was different from the bracket 40 of the example of FIG. 2 only in that the meeting portion 60 extended along the axial direction of the first outer cylinder member 9 over the entire length of the meeting portion 60, and was connected to the outer circumferential surface of the first outer cylinder member 9 so as to overlap the meeting portion 60 of the rod portion 30, and the joint portion 61 was formed, on the outer circumferential surface side of the first outer cylinder member 9, only on a part of the meeting portion 60 extending on the outer side of the outer circumferential surface of the rod portion 30. Further, load of the same magnitude was respectively input in the axial direction of the rod portion 30 into the brackets of the example of FIG. 2 and of the comparative example, and the stress generated then in the vicinity of the end portion of the rod 30 on the first outer cylinder member 9 side was compared. As a result, the stress generated in the vicinity of the end portion, on the first outer cylinder member 9 side, of the rod 30 of the bracket 40 according to the example of FIG. 2 was 0.50 times the stress generated in the vicinity of the end portion, on the first outer cylinder member 9 side, of the rod 30 of the bracket according to the comparative example. Moreover, the meeting portion 60 of the bracket 40 of the example of FIG. 2 had a larger extending length of the joint portion 61 than the meeting portion 60 of the bracket of the comparative example, and thus was able to obtain higher joint strength of the meeting portion 60. Thereby, the bracket 40 of the example of FIG. 2 was able to obtain a higher durability of the first outer cylinder member 9 than the bracket of the comparative example.

Figure 3:
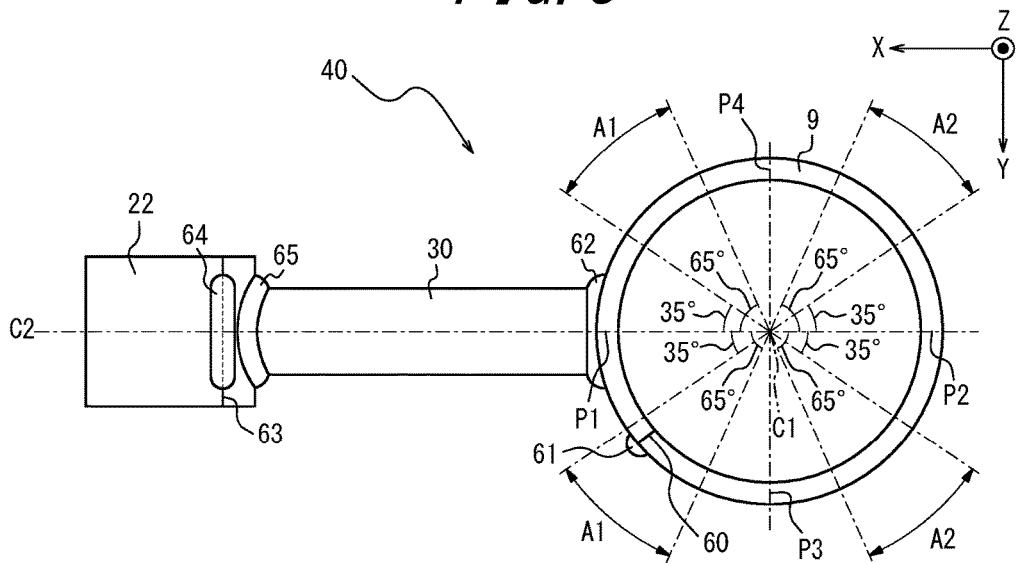
FIG. 3 illustrates a plan view showing the bracket of the vibration damping device of FIG. 1.

Here, as illustrated in FIG. 3, it is preferable when the meeting portion 60 of the first outer cylinder member 9 is located within an angular range A1, A2 in the circumferential direction of the first outer cylinder member 9 distanced by 35° to 65° along the circumferential direction of the first outer cylinder member 9, from the positions P1, P2 where the first outer cylinder member 9 and the central axis C2 of the rod portion 30 intersect each other. More specifically, it is preferable when the meeting portion 60 of the first outer cylinder member 9 is located within either one of the following four angular ranges: a pair of first angular ranges A1 along the circumferential direction of the first outer cylinder member 9, respectively extending from a circumferential position, distanced by 35° from a first position P1, to another circumferential position, distanced by 65° from the first position P1, along the circumferential direction of the first outer cylinder member 9 toward either sides in the circumferential direction, wherein the first position P1 is where the first outer cylinder member 9 and the central axis C2 of the rod portion 30 intersect each other on the rod portion 30 side with respect to the central axis C1 of the cylinder member 9; and a pair of second angular ranges A2 along the circumferential direction of the first outer cylinder member 9, respectively extending from a circumferential position, distanced by 35° from a second position P2, to another circumferential position, distanced by 65° from the second position P2, along the circumferential direction of the first outer cylinder member 9 toward either sides in the circumferential direction, wherein the second position P2 is where the first outer cylinder member 9 and the central axis C2 of the rod portion 30 intersect each other on the opposite side of the rod portion 30 with respect to the central axis C1 of the cylinder member 9. Here, the expression "angular range A1, A2 in the circumferential direction of the first outer cylinder member 9" refers to an angular range along the circumference around the central axis C1 of the first outer cylinder member 9.

Upon a load input in the axial direction of the rod portion 30, stress concentrates specifically at four circumferential portions of the first outer cylinder member 9, i.e., the portions near the positions P1, P2 where the first outer cylinder member 9 intersects the central axis C2 of the rod portion 30, and the portions near circumferential positions P3, P4 respectively distanced by 90° from the intersecting positions P1, P2 along the circumferential direction of the first outer cylinder member 9 toward either sides in the circumferential direction. By locating the meeting portion 60 within the first angular range A1 or the second angular range A2, in which stress is relatively unlikely to concentrate, it is possible to further suppress the stress generated in the vicinity of the meeting portion 60 in response to the load input in the axial direction of the rod portion 30. Thereby, it is possible to improve the durability of the first outer cylinder member 9.

In order to confirm the above, performances were evaluated via analysis for a plurality of brackets, each of which had the same configuration as the bracket 40 of the example of FIG. 2, and was different from each other only in the circumferential position of the meeting portion 60 of the first outer cylinder member 9. Specifically, to each bracket, a load of the same magnitude was input in the axial direction of the rod 30, and the stress generated then in the vicinity of the meeting portion 60 was compared. The result was as shown in Table 1. In Table 1, the "angle" refers to the angle along the circumferential direction of the first outer cylinder member 9, from the first position P1, where the first outer cylinder member 9 and the central axis C2 of the rod portion 30 intersected each other on the rod portion 30 side with respect to the central axis C1 of the first outer cylinder member 9, to the position of the meeting portion 60. The "stress" in Table 1 refers to a relative index value representing the stress value obtained for each "angle", wherein the stress value obtained when the aforementioned "angle" was 50° was represented as 1.0.

TABLE 1

| Angle [°] | 30 | 35 | 50 | 65 | 70 |
|---|---|---|---|---|---|
| Stress (Index value) | 2.4 | 1.7 | 1.0 | 1.7 | 2.4 |

From the result in Table 1, it was confirmed that, in the case where the angle, along the circumferential direction of the first outer cylinder member 9, from the first position P1, where the first outer cylinder member 9 and the central axis C2 of the rod portion intersect each other on the rod portion side with respect to the central axis C1 of the first outer cylinder member 9, to the position of the meeting portion 60, is 35° to 65°, it is possible to favorably suppress the stress in response to the load input in the axial direction of the rod portion, and in particular, when the angle is 50°, it is possible to greatly suppress the stress.

The vibration damping device 1 of the present embodiment is not limited to the aforementioned configurations, and may have various variations.

For example, when the meeting portion 60 is seen from the outer circumferential side of the first outer cylinder member 9, at least a part of the portion of the meeting portion 60 where the joint portion 61 is formed may extend in a direction intersecting the axial direction of the first outer cylinder member 9. In this case, for example, as compared with the case where the entire portion of the meeting portion 60 where the joint portion 61 is formed extends in the axial direction of the first outer cylinder member 9, as in the example of FIG. 2, it is possible to obtain a larger extending length of the joint portion 61 formed on the meeting portion 60. Thereby, it is possible to further improve the durability of the first outer cylinder member 9.

Here, a similar configuration as the meeting portion 60 and the joint portion 61 of the first outer cylinder member 9 may be applied to the second outer cylinder member 22 as well, and in this case, it is possible to improve the durability of the second outer cylinder member 22 against the load input in the axial direction of the rod portion 30.

Moreover, the joint portions 61, 62, 64 and 65 may be formed by performing any other kind of joining than welding.

REFERENCE SIGNS LIST

1 vibration damping device
9 first outer cylinder member (outer cylinder member)
10 intermediate cylinder member
11 first inner mounting member (inner mounting member)
14 main elastic body (elastic member)
15, 16 stopper elastic body
17, 18 cavity portion
21 second inner mounting member
22 second outer cylinder member
24 second elastic member
30 rod portion
31 first bush
32 second bush
40 bracket
60, 63 meeting portion
61, 62, 64, 65 joint portion

The invention claimed is:

1. A vibration damping device, comprising:
   an outer cylinder member formed by winding a flat plate member into a cylindrical shape;
   an inner mounting member positioned at an inner circumferential side of the outer cylinder member, connected to the outer cylinder member via an elastic member, and configured to be connected to either one of a vibration generating portion and a vibration receiving portion; and
   a rod portion configured to connect the outer cylinder member to an other one of the vibration generating portion and the vibration receiving portion, wherein:
   the outer cylinder member has a meeting portion, where end surfaces of the flat plate member, on both sides in a circumferential direction of the outer cylinder member, face each other,
   a joint portion, where joining was performed, is formed on at least a part of the meeting portion;
   the rod portion is joined to an outer circumferential surface of the outer cylinder member so as to not overlap the meeting portion, and
   the meeting portion is located within an angular range in a circumferential direction of the outer cylinder member, displaced by 35° to 65° along the circumferential direction of the outer cylinder member, from a position where the outer cylinder member and a central axis of the rod portion intersect each other.

2. The vibration damping device according to claim 1, wherein:
   when the meeting portion is seen from an outer circumferential side of the outer cylinder member, at least a part of a portion of the meeting portion on which the joint portion is formed extends in a direction intersecting an axial direction of the outer cylinder member.

3. The vibration damping device according to claim 1, wherein:
   the meeting portion comprises:
      end parts along an axial direction of the outer cylinder member; and
      an intermediate part provided between the end parts along the axial direction, and
   only the intermediate part of the meeting portion is joined by the joint portion.

4. The vibration damping device according to claim 1, wherein the rod portion has a tubular shape or a solid shape.

5. The vibration damping device according to claim 1, wherein an end portion of the rod portion is joined to the outer circumferential surface of the outer cylinder member along an entire circumference of the rod portion.

* * * * *